UNITED STATES PATENT OFFICE.

EMIL FISCHER, OF BERLIN, GERMANY, ASSIGNOR TO FARBENFABRIKEN VORM. FRIEDR. BAYER & CO., OF ELBERFELD, GERMANY, A CORPORATION OF GERMANY.

STRONTIUM SALT OF DIBROM-BEHENIC ACID.

No. 920,306.  Specification of Letters Patent.  Patented May 4, 1909.

Application filed January 28, 1909. Serial No. 474,811.

*To all whom it may concern:*

Be it known that I, EMIL FISCHER, professor of chemistry, citizen of the German Empire, residing at Berlin, Germany, have invented new and useful Improvements in A Strontium Salt of Dibrom-Behenic Acid, of which the following is a specification.

I have found that the dibrombehenic acid gives a solid stable, tasteless and odorless strontium salt, which is a valuable substitute for potassium bromid, an average dose being from 1 to 2 grams.

My new preparation is obtained by converting the free dibrombehenic acid or its alkaline salts into the strontium salt. The dibrombehenic acid is prepared by treating erucic acid with bromin.

The preparation of the strontium salt of dibrombehenic acid is carried out as follows: 49.8 parts of dibrombehenic acid are dissolved in caustic potash by shaking it at ordinary temperature with highly diluted caustic potash (about 1/40 normal) containing 5.6 parts of KOH. A dilute aqueous solution of 13.3 parts of chlorid of strontium ($SrCl_2 + 6$ aq) is added to the solution, and it is stirred until the colorless flocculent precipitate has settled. It is filtered off with suction, pressed, washed with alcohol, mixed up by stirring with cold water, filtered off with suction and subsequently washed with water until the wash-water is free from chlorin. It is then washed with alcohol and dried *in vacuo*. The strontium salt thus obtained is a white, tasteless and odorless powder almost insoluble in water and alcohol, soluble in ether and chloroform. It has the formula: $(C_{22}H_{41}O_2Br_2)_2Sr$.

Having now described my invention and in what manner the same is to be performed, what I claim as new and desire to secure by Letters Patent is:—

The herein-described strontium salt of dibrombehenic acid of the following formula $$(C_{22}H_{41}O_2Br_2)_2Sr$$

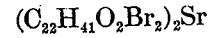

obtainable by treating an alkaline solution of dibrombehenic acid with chlorid of strontium, which strontium salt is a white solid body, tasteless, odorless and almost insoluble in water and alcohol, soluble in ether and chloroform, and which is a valuable substitute for potassium bromid, substantially as hereinbefore described.

In testimony whereof I have hereunto set my hand in the presence of two subscribing witnesses.

EMIL FISCHER.

Witnesses:
 WOLDEMAR HAUPT,
 HENRY HASPER.